United States Patent [19]
Ui

[11] Patent Number: 5,286,073
[45] Date of Patent: Feb. 15, 1994

[54] DEVICE FOR FASTENING AJAR DOOR

[75] Inventor: Kunio Ui, Komatsu, Japan

[73] Assignee: Kabushiki Kaisha Komatsu Seisakusho, Tokyo, Japan

[21] Appl. No.: 956,755

[22] PCT Filed: May 31, 1991

[86] PCT No.: PCT/JP91/00737

§ 371 Date: Dec. 8, 1992

§ 102(e) Date: Dec. 8, 1992

[87] PCT Pub. No.: WO91/19875

PCT Pub. Date: Dec. 26, 1992

[30] Foreign Application Priority Data

Jun. 20, 1990 [JP] Japan .................. 2-65170[U]

[51] Int. Cl.$^5$ .............................................. E05C 3/26
[52] U.S. Cl. .................... 292/216; 292/210; 292/278; 49/379
[58] Field of Search ............ 292/210, 216, 277, 278, 292/DIG. 8, DIG. 19, DIG. 30; 49/379

[56] References Cited

U.S. PATENT DOCUMENTS

| | | | |
|---|---|---|---|
| 889,365 | 6/1908 | Gray | 292/216 |
| 1,120,095 | 12/1914 | Shook | 292/216 X |
| 1,937,520 | 12/1933 | Lightner | 292/216 |
| 2,693,976 | 11/1954 | Bontempo | 292/216 |
| 2,863,200 | 12/1958 | Miller et al. | 292/216 X |
| 3,439,948 | 4/1969 | Smith | 292/216 |
| 3,730,575 | 5/1973 | Arlauskas et al. | 292/216 |

FOREIGN PATENT DOCUMENTS 50-128817 10/1975 Japan .
52-21623 2/1977 Japan .
52-149897 11/1977 Japan .
59-22864 7/1984 Japan .

Primary Examiner—Richard E. Moore
Attorney, Agent, or Firm—Richards, Medlock & Andrews

[57] ABSTRACT

A device for fastening an ajar door of the operator's cab of a construction machine, which is small in size, presents a good appearance, and is easy to unfasten, has a plate support element (5) fixed to the outer surface of the operator's cab (2), a tubular support element (6) to hold the plate support element, a U-shaped striker (10) fixed to the plate support element, a lock (20) for holding the striker when the door is ajar, and a releasing lever (30) for releasing the lock from inside the operator's cab.

20 Claims, 4 Drawing Sheets

DEVICE FOR FASTENING AJAR DOOR

TECHNICAL FIELD

The present invention relates to a device for fastening an ajar door, and more particularly, to a device for fastening an ajar door of an operator's cab.

BACKGROUND ART

Conventionally, an operator's cab having a device fastening the ajar door is constructed as in a perspective view shown in FIG. 6, and details of the device, indicated and are shown in the perspective view in FIG. 7, an elevational view in FIG. 8 and a top plan view in FIG. 9.

More specifically, a door 2 is swingably fixed to a side 3 of an operator's cab I by means of a hinge 4. A lock member 40 having a lock element 41 is fastened near the hinge 4 above the door 2 by means of a bolt 42. A bracket is attached to a position corresponding to the lock member 40 above the side 3, and a lock 50 is fastened by a bolt 55. The lock 50 includes a hook 51, a bracket 52, a pin 53 and a torsional spring 54 wherein the hook 51 is secured pivotally to the bracket 52 by means of the pin 53 and is urged in the direction of the arrow P (FIG. 8) by means of the torsional spring 54. The door is ajar and fastened by swinging the door 2 on the hinge 4 so as to allow the lock element 41 to push up the hook 51 against the urging force of the torsional spring 54 and to engage the hook 51 at the position indicated by chain double-dashed lines in FIGS. 8 and 9. The lock is unfastened by pushing up the hook 51 manually, thereby allowing the door 2 to close.

However, the foregoing construction has the following problems:

(1) Since the fastening device is fixed adjacent to the hinge of the door, the distance $L_2$ (FIG. 9) between the center of the hinge and the center of the lock is small, and the lock is heavily burdened. Consequently, the fastening device has to be large and costly.

(2) Since the fastening device greatly protrudes at the top of the operator's cab, it might be damaged by obstacles and does not present a good appearance.

(3) Someone has to take the trouble to go out of the cab and release the lock manually to unfasten the ajar door, and this is operationally inconvenient.

In view of the foregoing problems, an object of the present invention is to provide a device for fastening the ajar door which device is small in size, presents a good appearance, and is easy to unfasten.

SUMMARY OF THE INVENTION

To this end, a device for fastening an ajar door comprises a plate support element fixed adjacent to the center of the hinge side of the outer surface of a door of an operator's cab, a tubular support element connected at one end to the plate support element and at the other end to the outer surface of the door, a U-shaped striker fixed to the plate support element, a lock fixed to the side wall of the operator's cab for holding the striker which moves together with the door when the door is ajar, and an unfastening lever for releasing the lock from inside the operator's cab. The tubular support element is three-dimensionally formed so that it will not block an operator's line of vision; the lock comprises a hook having an engaging surface, a pin securing the hook pivotally, and a spring urging the hook counter-clockwise; and the unfastening lever comprises a stopper having an engaging surface at one end and a lever at the other end, a pin securing the stopper pivotally, and a spring urging the stopper clockwise. According to this construction, when the door is ajar, the fastening device holds the striker and keeps the door ajar. The fastening device is easily unfastened by operating the unfastening lever in the operator's cab. The advantages obtained from this are as follows:

(1) The distance $L_1$ (FIG. 4) between the center of the hinge and the center of the fastening device is greater, and thus the device is not so heavily burdened and accordingly the fastening device can be small.

(2) Since the fastening device does not protrude from the top of the operator's cab, it will not be damaged by obstacles. The tubular support element also functions as a handle outside of the operator's cab, and presents a good appearance.

(3) It is operationally convenient to unfasten the ajar door from inside the operator's cab.

THE BEST MODE FOR CARRYING OUT THE INVENTION

An embodiment of the present invention will be described in detail with reference to the drawings.

Figure 1:
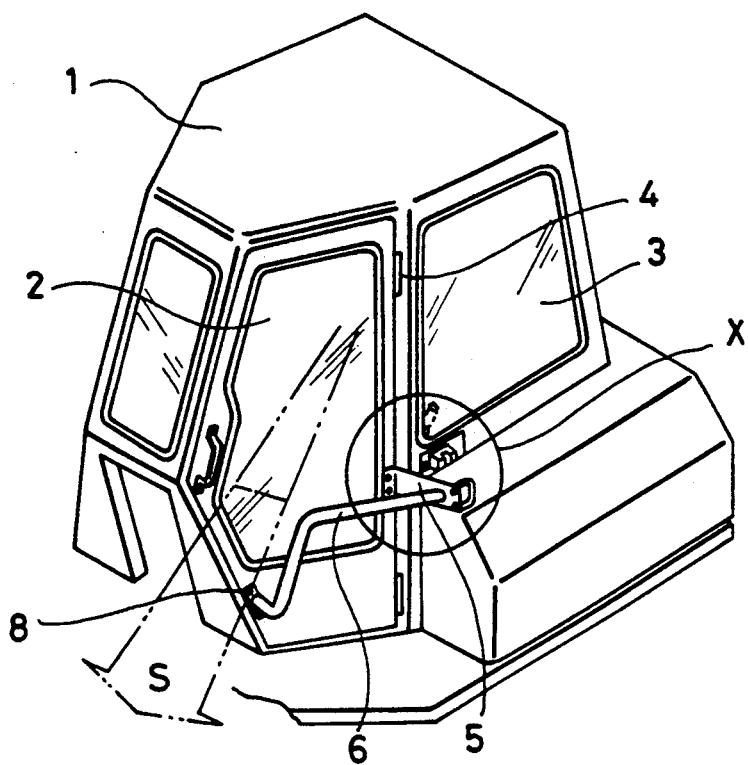
FIG. 1 is a perspective view of an operator's cab provided with a fastening device of the invention.
Figures 2, 3:
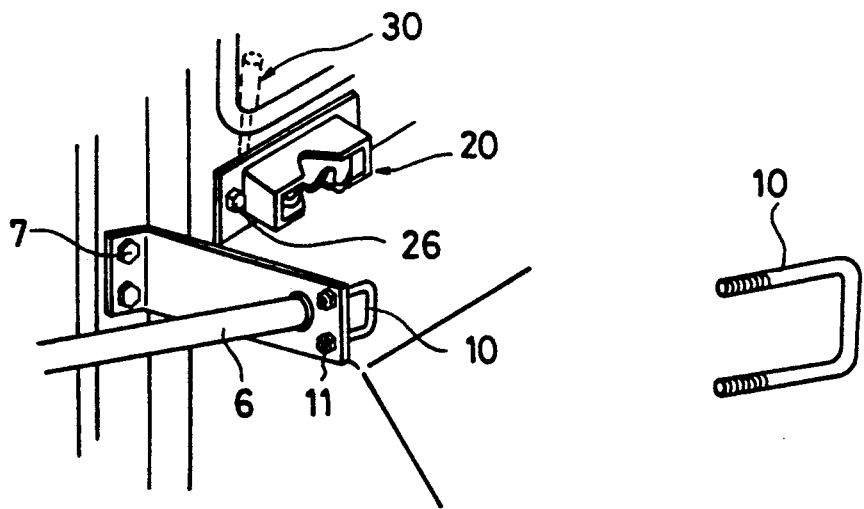
FIG. 2 is an enlarged perspective view of the fastening device shown in FIG. 1.
FIG. 3 is a perspective view of a striker.

FIG. 1 is an exterior perspective view, and FIG. 2 is an enlarged perspective view of the fastening device indicated as X in FIG. 1.

One end of an outwardly extending door 2 is swingably fixed to a side 3 of an operator's cab 1 by means of a hinge 4. A plate support element 5 and one end of a tubular support element 6 are fixed, and fastened to the outer surface of the door 2 by means of bolts 7 and 8 resepctively, with the other end of tubular support element 6 being secured to the outer end portion of plate support element 5. The inner end of the plate support element 5 is fixed to the outer surface of the door 2 at a point adjacent to the center of the hinge side of the door 2. The tubular support element 6 is three-dimensionally formed so that it will not block the operator's line of vision indicated by the arrow S in FIG. 1. A U-shaped striker 10 shown in FIG. 3 is fastened to an outer end portion the plate support element 5 by means of nuts 11. A lock 20 is fastened by a bolt 26 to the position corresponding to the striker 10 on the side 3 of the operator's cab 1, for holding the striker 10 when the door 2 is in the desired ajar position. A releasing lever 30 of the lock 20 protrudes into the operator's cab 1.

Figure 4:
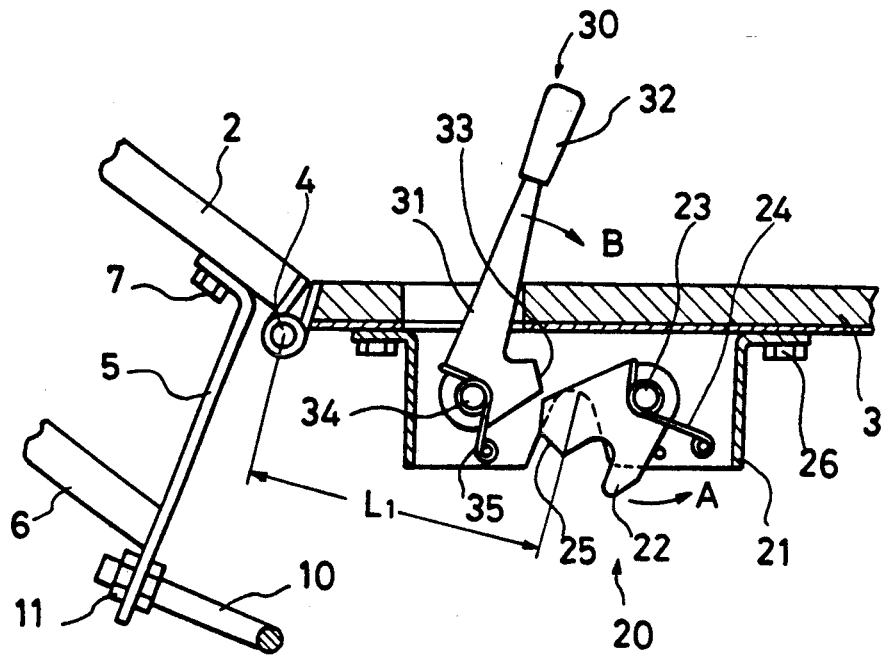
FIG. 4 is a sectional plan view of the fastening device when the door is closed.

FIG. 4 is a sectional plan view of the lock 20 wherein a bracket 21 is fastened to the side 3 of the operator's cab 1 adjacent to the door 2 by the bolt 26, and a hook 22 having an engaging surface 25 is secured pivotally to the bracket 21 by means of a pin 23. The hook 22 is urged counterclockwise as indicated by the arrow A, by a torsional spring 24. The releasing lever 30, which includes a handle 32 and a lever arm 31 having an engaging surface 33, is pivoted to the bracket 21 by a pin 34. The lever arm 31 is urged clockwise as indicated by the arrow B by a torsional spring 35. The lever 30 protrudes into the operator's cab through the side 3.

Figure 5:
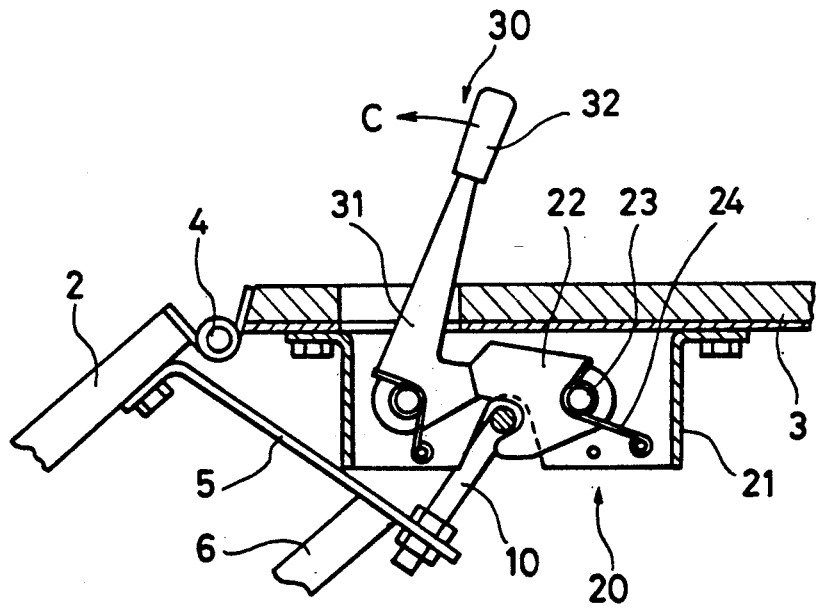
FIG. 5 is a sectional plan view of the fastening device when the door is ajar and fastened.
Figure 6:
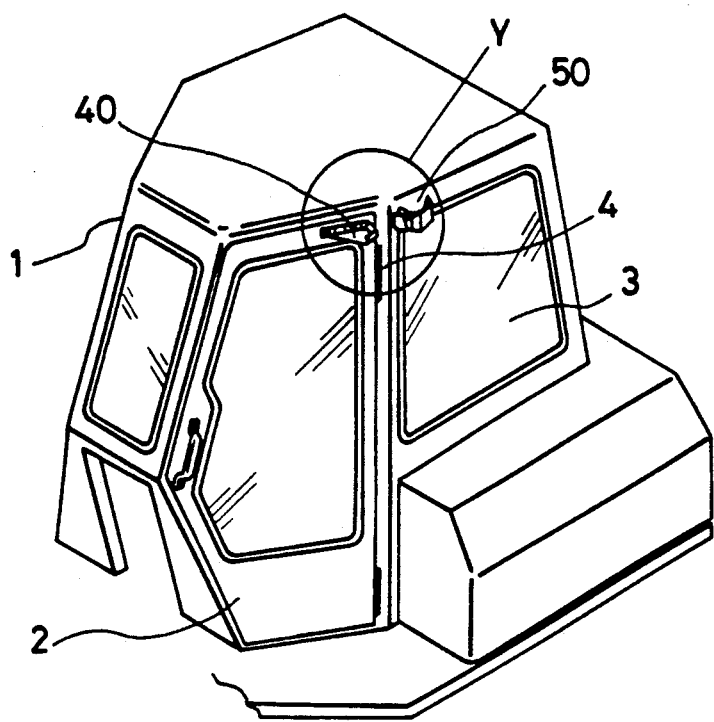
FIG. 6 is a perspective view of the operator's cab provided with the conventional fastening device fixed thereto.
Figure 7:
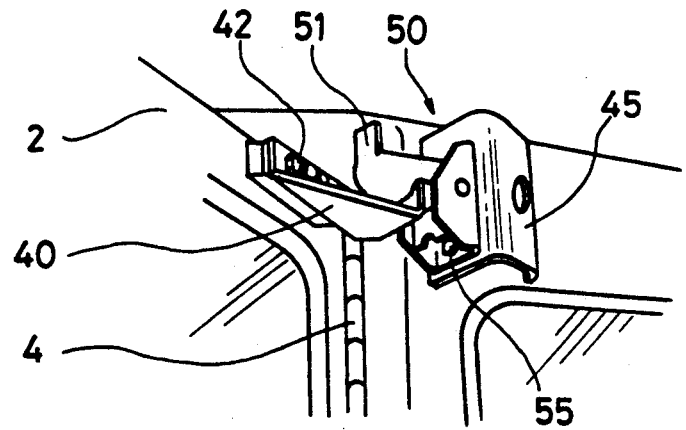
FIG. 7 is an enlarged perspective view of the fastening device shown in FIG. 6.
Figure 8:
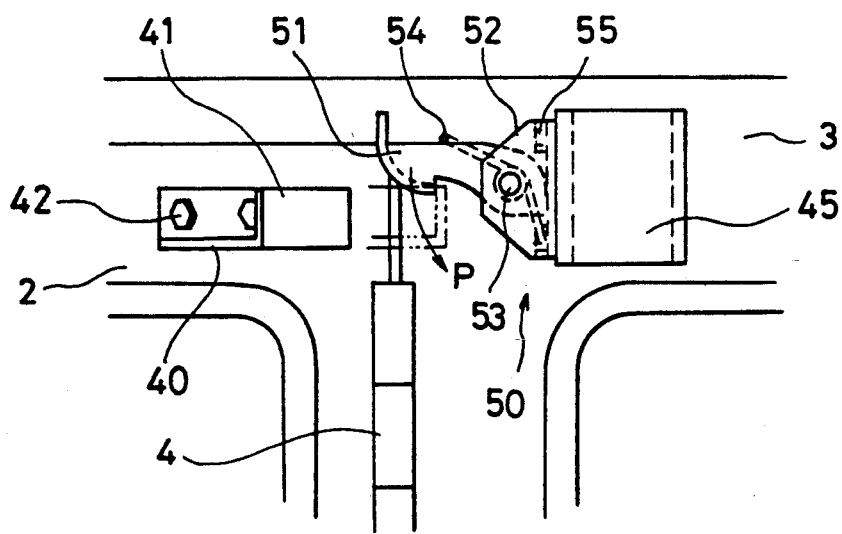
FIG. 8 is a front view of the conventional fastening device.
Figure 9:
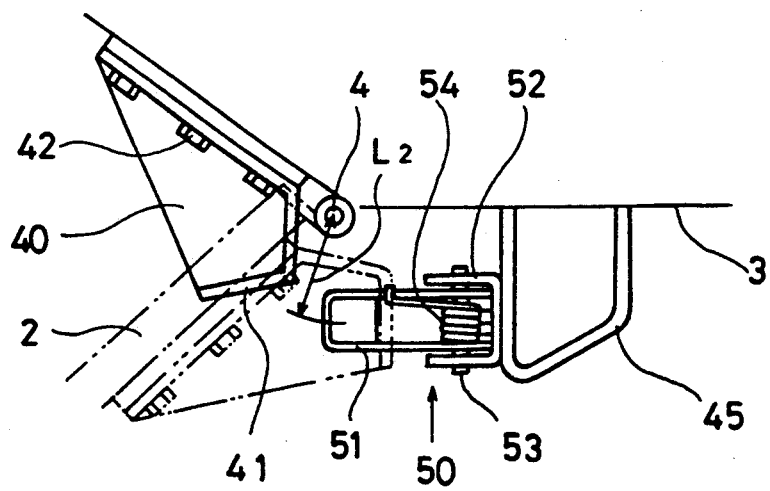
FIG. 9 is a plan view of the device shown in FIG. 8.

A description of the operation will be given. FIG. 4 shows the door 2 closed. When the door 2 swings on the hinge 4 and opens, the striker 10 pushes up the hook 22 and rotates the hook 22 clockwise against the force of the torsional spring 24 so as to allow the engaging surface 25 of the hook 22 and the engaging surface 33 of the lever arm 31 to engage as shown in FIG. 5 and the hook 22 to hold the striker 10, thereby fastening the ajar door 2. The lock is returned to the released condition shown in FIG. 4 by rotating the releasing lever 30 counterclockwise as indicated by the arrow C in FIG. 5 so as to allow the two engaging surfaces to disengage and the hook 22 to swing counterclockwise by the force of the torsional spring 24.

INDUSTRIAL APPLICABILITY

The present invention is useful as a device for fastening an ajar door, which device is small in size, presents a good appearance, and is easy to unfasten, and more particularly, is useful as a device for fastening the ajar door of the operator's cab of a construction machine.

What is claimed is:

1. A device for fastening an ajar door comprising:
   a plate support element fixed adjacent to the center of the hinge side of the outer surface of a door of an operator's cab;
   a tubular support element connected at one end to said plate support element and at the other end to said outer surface of the door;
   a U-shaped striker fixed to said plate support element;
   a lock fixed to the side wall of the operator's cab for holding said striker when the door is ajar; and
   a releasing lever for releasing said lock from inside the operator's cab, said lever passing through said side wall of the operator's cab.

2. A device for fastening the ajar door as claimed in claim 1, wherein said tubular support element is three-dimensionally formed so that it will not block an operator's line of vision.

3. A device for fastening the ajar door as claimed in claim 1, wherein said lock comprises a hook having an engaging surface, a pin securing said hook pivotally, and a spring urging said hook counterclockwise.

4. A device for fastening the ajar door as claimed in claim 1, wherein said releasing lever comprises a lever arm having an engaging surface at one end and a handle at the other end, a pin securing said lever arm pivotally, and a spring urging said lever arm clockwise.

5. A machine having an operator's cab, said operator's cab having a wall with a door hinged thereto, and a device for fastening said door in an ajar condition, said device comprising:
   a first support element extending outwardly from the outer surface of said door, said first support element comprising a plate extending outwardly from the outer surface of said door;
   a second support element having one end secured to said first support element and a second end secured to the outer surface of said door;
   a striker attached to said first support element;
   a lock attached to said wall at a position wherein said striker engages said lock when said door is in the desired ajar condition, to thereby fasten said door in the desired ajar condition; and
   a releasing lever extending into said operator's cab for releasing said striker from said lock.

6. A machine in accordance with claim 5, wherein said first support element is mounted on said door at an intermediate location between the top and bottom of said door.

7. A machine in accordance with claim 5, wherein said first support element is mounted on said door at a location adjacent to the hinge side of said door.

8. A machine in accordance with claim 5, wherein said second support element comprises a tubular element which is positioned so as not to block the line of vision of an operator in said operator's cab.

9. A machine in accordance with claim 5 wherein said lock comprises a hook having an engaging surface, a pin pivotally securing said hook, and a spring urging the rotation of said hook about said pin.

10. A machine in accordance with claim 5 wherein said releasing lever comprises a lever arm having a handle and an engaging surface, a pin pivotally securing said level arm, and a spring urging the rotation of said lever arm about said pin.

11. A machine in accordance with claim 5 wherein said lock comprises a hook having an engaging surface, a first pin pivotally securing said hook, and a first spring urging the rotation of said hook in a first direction about said first pin; and wherein said releasing lever comprises a lever arm having a handle and an engaging surface, a second pin pivotally securing said lever arm, and a second spring urging the rotation of said lever arm in a second direction about said second pin; whereby the engaging surface of aid hook engages the engaging surface of said releasing lever when said striker engages said lock, with said first and second springs urging said hook and said lever arm to maintain the engagement of the engaging surface of said hook with the engaging surface of said lever arm.

12. A machine in accordance with claim 13, further comprising a second support element having one end secured to said first support element and a second end secured to the outer surface of said door.

13. A machine in accordance with claim 12, wherein said second support element comprises a tubular element which is positioned so as not to block the line of vision of an operator in said operator's cab.

14. A machine in accordance with claim 13, wherein said first support element is mounted on said door at an intermediate location between the top and bottom of said door.

15. A machine in accordance with claim 14, wherein said first support element is mounted on said door at a location adjacent to the hinge side of said door.

16. A machine in accordance with claim 11, wherein said first support element is mounted on said door at a central location between the top and bottom of said door.

17. A machine in accordance with claim 11, wherein said first support element is mounted on said door at a location adjacent to the hinge side of said door.

18. A machine having an operator's cab, said operator's cab having a wall with a door hinged thereto, and a device for fastening said door in an ajar condition, said device comprising:

a first support element, said first element comprising a plate extending outwardly from the outer surface of said door;

a striker attached to an outer end portion of said plate;

a lock attached to said wall at a position wherein said striker engages said lock when said door is in the desired ajar condition, to thereby fasten said door in the desired ajar condition; and a releasing lever extending into said operator's cab for releasing said striker from said lock.

19. A machine in accordance with claim 18, further comprising a second support element having one end secured to an outer end portion of said plate and a second end secured to the outer surface of said door.

20. A machine in accordance with claim 18 wherein said lock comprises a hook having an engaging surface, a pin pivotally securing said hook, and a spring urging the rotation of said hook about said pin; and wherein said releasing lever comprises a lever arm having a handle and an engaging surface, a pin pivotally securing said lever arm, and a spring urging the rotation of said lever arm about said pin.

* * * * *

UNITED STATES PATENT AND TRADEMARK OFFICE
CERTIFICATE OF CORRECTION

PATENT NO. : 5,286,073
DATED : February 15, 1994
INVENTOR(S) : Kunio UI

It is certified that error appears in the above-indentified patent and that said Letters Patent is hereby corrected as shown below:

Column 4, line 40, delete "aid" and insert --said--.

Column 4, line 46, delete "claim 13" and insert --claim 11--.

Column 5, line 5, after "first", insert --support--.

Delete claim 20, column 6, lines 7-14 and insert the following:

--A machine in accordance with claim 18 wherein said lock comprises a hook having an engaging surface, a first pin pivotally securing said hook, and a first spring urging the rotation of said hook about said first pin; and wherein said releasing lever comprises a lever arm having a handle and an engaging surface, a second pin pivotally securing said lever arm, and a second spring urging the rotation of said lever arm about said second pin.--

Signed and Sealed this

Nineteenth Day of July, 1994

Attest:

BRUCE LEHMAN

*Attesting Officer*    *Commissioner of Patents and Trademarks*